(12) United States Patent
Lauer et al.

(10) Patent No.: US 7,539,150 B2
(45) Date of Patent: May 26, 2009

(54) NODE DISCOVERY AND COMMUNICATIONS IN A NETWORK

(75) Inventors: John Donald Lauer, Tucson, AZ (US); Richard Kenneth Martinez, Tucson, AZ (US); Brian Sean McCain, Tucson, AZ (US); Amy Lynn Therrien, Tucson, AZ (US); Yan Xu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 10/991,288

(22) Filed: Nov. 16, 2004

(65) Prior Publication Data

US 2006/0117101 A1 Jun. 1, 2006

(51) Int. Cl.
*H04L 12/28* (2006.01)
(52) U.S. Cl. ........................... 370/254; 709/224
(58) Field of Classification Search ............. None
See application file for complete search history.

(56) References Cited

U.S. PATENT DOCUMENTS

| | | | |
|---|---|---|---|
| 6,487,607 B1 | 11/2002 | Wollrath et al. | |
| 6,549,955 B2 | 4/2003 | Gutherie et al. | |
| 6,629,128 B1 | 9/2003 | Glass | |
| 6,735,200 B1 | 5/2004 | Novaes | |
| 6,775,244 B1 * | 8/2004 | Hattig | 370/257 |
| 7,159,070 B2 * | 1/2007 | Kilian et al. | 711/108 |
| 7,197,548 B1 * | 3/2007 | Ptasinski et al. | 709/223 |
| 2002/0114341 A1 | 8/2002 | Sutherland et al. | |
| 2003/0070006 A1 | 4/2003 | Nadler et al. | |
| 2003/0095504 A1 | 5/2003 | Ogier | |
| 2003/0099235 A1 * | 5/2003 | Shin et al. | 370/390 |
| 2003/0115379 A1 | 6/2003 | Burton et al. | |
| 2003/0154238 A1 | 8/2003 | Murphy et al. | |
| 2003/0177170 A1 | 9/2003 | Glass | |
| 2003/0177205 A1 | 9/2003 | Liang et al. | |
| 2003/0179742 A1 | 9/2003 | Ogier et al. | |
| 2003/0182427 A1 | 9/2003 | Halpern | |

(Continued)

FOREIGN PATENT DOCUMENTS

EP 1135001 A2 9/2001

(Continued)

OTHER PUBLICATIONS

U.S. Patent Application entitled "Dynamic Generator for Fast-Client Static Proxy from Service Interface", U.S. Appl. No. 10/428,206, filed Apr. 30, 2003, by inventor Y. Yoon.

(Continued)

*Primary Examiner*—William Trost
*Assistant Examiner*—Toan D Nguyen
(74) *Attorney, Agent, or Firm*—Rabindranath Dutta; Konrad Raynes & Victor LLP

(57) ABSTRACT

A plurality of broadcast messages are sent from at least one node of a plurality of nodes of a network. A node is discovered based on a received message. An entry is stored, wherein the entry corresponds to the node and a timestamp that indicates a time at which the node was last discovered. A notification is made that the node is offline, in response to determining that a predetermined time has elapsed since the timestamp was last updated.

10 Claims, 9 Drawing Sheets

U.S. PATENT DOCUMENTS

| | | |
|---|---|---|
| 2003/0208640 A1 | 11/2003 | Just |
| 2004/0010538 A1* | 1/2004 | Miller et al. ............... 709/201 |
| 2004/0010575 A1 | 1/2004 | Wookey et al. |
| 2004/0103407 A1 | 5/2004 | Blaukopf et al. |
| 2004/0158780 A1 | 8/2004 | Conrad |
| 2006/0080410 A1* | 4/2006 | Maclarty et al. ............ 709/220 |
| 2006/0184672 A1 | 8/2006 | Lauer et al. |

FOREIGN PATENT DOCUMENTS

| | | |
|---|---|---|
| WO | 0106706 | 1/2001 |
| WO | 2004047403 | 6/2004 |

OTHER PUBLICATIONS

U.S. Patent Application entitled "Reconfiguring a Network by Utilizing a Predetermined Length Quiescent State", U.S. Appl. No. 10/436,222, filed May 12, 2003, by inventors C.H. Chang; O.T. Kirby, D.D. Jurgensen, and F. Knop.

Great Britain patent application entitled "Data Processing Systems", Serial No. 0227872.2, filed Nov. 29, 2002, by inventors P.N. Cashman, C.F. Fuente, W.J. Scales.

U.S. Patent Application entitled "Interface for Application Components", Serial No. not yet assigned, filed Nov. 16, 2004, by inventors J.D. Lauer, and Y.Xu.

S. Floyd, et al., "The Synchronization of Periodic Routing Messages", IEEE/ACM Transactions on Networking, Apr. 1994, [online], pp. 1-28. [Retrieved on Nov. 16, 2004}. Retrieved on the Internet at <URL:http://www.cs.wisc.edu/~suman/courses/640/s04/handouts/papers/floyd94synchronization.pdf>.

Letter regarding Art Cited in Counterpart Chinese Patent Application, dated Oct. 10, 2008, 1 p.

* cited by examiner

NODE DISCOVERY AND COMMUNICATIONS IN A NETWORK

BACKGROUND

1. Field

The disclosure relates to a method, system, and article of manufacture for node discovery and communications in a network.

2. Background

A network may include a collection of nodes, such as computing systems, storage servers, etc., that are in communication with each other over communication links. There are many types of network, including local area networks (LAN), wide area networks (WAN), intranet, Internet, Storage Area Networks (SAN), etc. A high-speed subnetwork of storage servers and storage devices may be included in a SAN, where the storage servers may provide or control access to data that may be stored in the storage devices. For example, IBM* TotalStorage* Enterprise Storage Servers* (ESS) may function as storage servers in a SAN environment.

New nodes may be added to a network in which a set of existing nodes are already in communication with each other. Additionally, certain nodes within a network may fail. Monitoring systems may be implemented within the network on routers or switches to monitor the status of the nodes. The monitoring systems may monitor the nodes and the network for the failure or activation of nodes.

The rerouting of messages in the event of a failure of a node may be handled by routers or switches within the network. Additionally, certain monitoring systems may use broadcasting information to monitor the status of the nodes of a network, where broadcasting is a method for simultaneously sending the same information via messages to a plurality of recipient nodes in a network.

SUMMARY OF THE DESCRIBED EMBODIMENTS

Provided are a method, system and article of manufacture, wherein a plurality of broadcast messages are sent from at least one node of a plurality of nodes of a network. A node is discovered based on a received message. An entry is stored, wherein the entry corresponds to the node and a timestamp that indicates a time at which the node was last discovered. A notification is made that the node is offline, in response to determining that a predetermined time has elapsed since the timestamp was last updated.

In certain additional embodiments, the plurality of nodes includes storage servers, wherein the network is a storage area network, and wherein the node is a first node. A message is sent to an operational second node in response to determining that the first node is offline, wherein the second node is an alternate node to the first node in a domain group that includes both the first node and the second node.

In yet additional embodiments, the sending, the discovering, the storing, and the notifying are performed by message routers that execute on the plurality of nodes, wherein a message router includes a broadcast thread for the sending of the broadcast messages, and a discovery thread for the discovering of the node.

In further embodiments, the sending of the broadcast messages includes generating a broadcast message that includes: (a) node identification of a sender node of the broadcast message; (b) an Internet Protocol address where incoming messages are received in the sender node; and (c) a port number where the incoming messages are received in the sender node. The broadcast message is broadcast to the network.

In still further embodiments, the node is a selected node of the plurality of nodes. The selected node and a selected timestamp corresponding to the selected node are read from a routing table. A determination is made as to whether the predetermined time has elapsed since the timestamp was last updated for the selected node in the routing table. A determination is made of those registered components that have registered to be informed on offline nodes, wherein the offline nodes are notified to the registered components. In further embodiments, the selected node is removed from the routing table, in response to determining that the predetermined time has elapsed since the timestamp was last updated for the selected node in the routing table.

In still further embodiments, the discovering and the storing further comprises listening on a multicast port for a broadcast message. A determination is made as to whether a sender node of the broadcast message is indicated in a routing table, wherein the discovered node is the sender node. The timestamp of the sender node is updated, in response to determining that the sender node is indicated in the routing table. The sender node and the timestamp of the sender node are added to the routing table, in response to determining that the sender node is not indicated in a routing table.

In further embodiments, a routing table is maintained that indicates a set of nodes selected from the plurality of nodes with last recorded times at which the set of nodes were operational. Also maintained is a domain group table that indicates a plurality of domain groups of the plurality of nodes, wherein an operational node of a selected domain group can process redirected messages that were generated for an offline node of the selected domain group.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
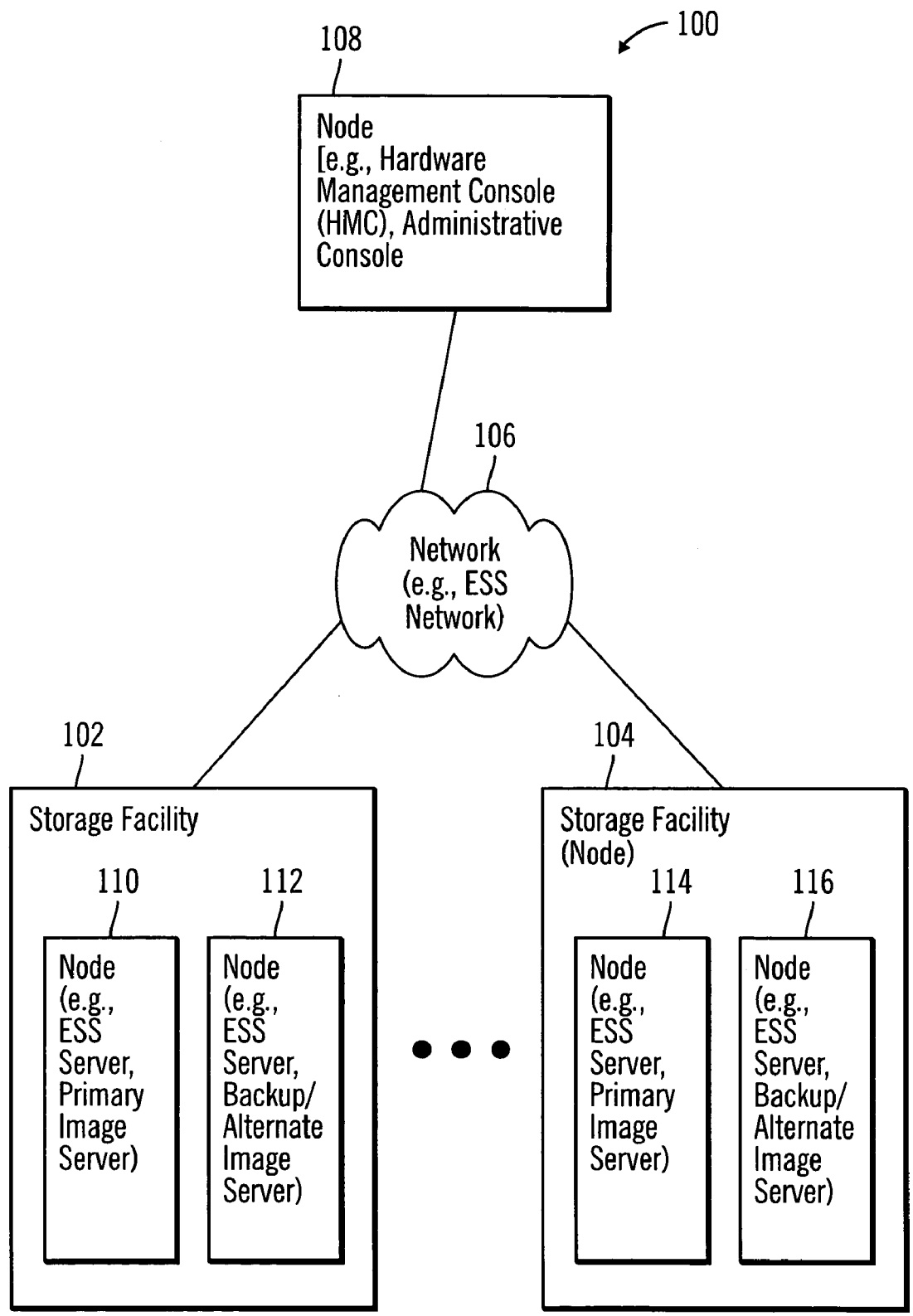
FIG. 1 illustrates a block diagram of a computing environment in accordance with certain embodiments.

FIG. 1 illustrates a block diagram of a computing environment 100 in accordance with certain embodiments. The computing environment 100 includes one or more storage facilities 102, 104 in communication over a network 106 to an administrative console 108.

The storage facilities 102, 104 may be comprised of two or more nodes. For example, the storage facility 102 may comprise a primary image server 110 and an alternate image server 112, and the storage facility 104 may comprise a primary image server 114 and an alternate image server 116. In certain embodiments, the alternate image servers 112, 116 may store backup data of the primary image servers 110, 114 respectively. In certain other embodiments, the nodes 110, 112, 114, 116 may be ESS servers.

In certain embodiments, the nodes 108, 110, 112, 114, 116 may comprise any suitable computational device, including those presently known in the art, such as, a storage server, a server, a personal computer, a workstation, a mainframe, a midrange computer, a network appliance, a palm top computer, a telephony device, a blade computer, a hand held computer, etc. The nodes 108, 110, 112, 114, 116 may be deployed in the computing environment 100 as nodes of the network 106, where the network 106 may include any suitable network, including those presently known in the art, such as, a SAN, a LAN, an Intranet, the Internet, an ESS network, etc.

Therefore, FIG. 1 illustrates certain embodiments in which a plurality of nodes 108, 110, 112, 114, 116 that may include storage servers are coupled over a network 106. The plurality of nodes may send messages over the network 106.

Figure 2:
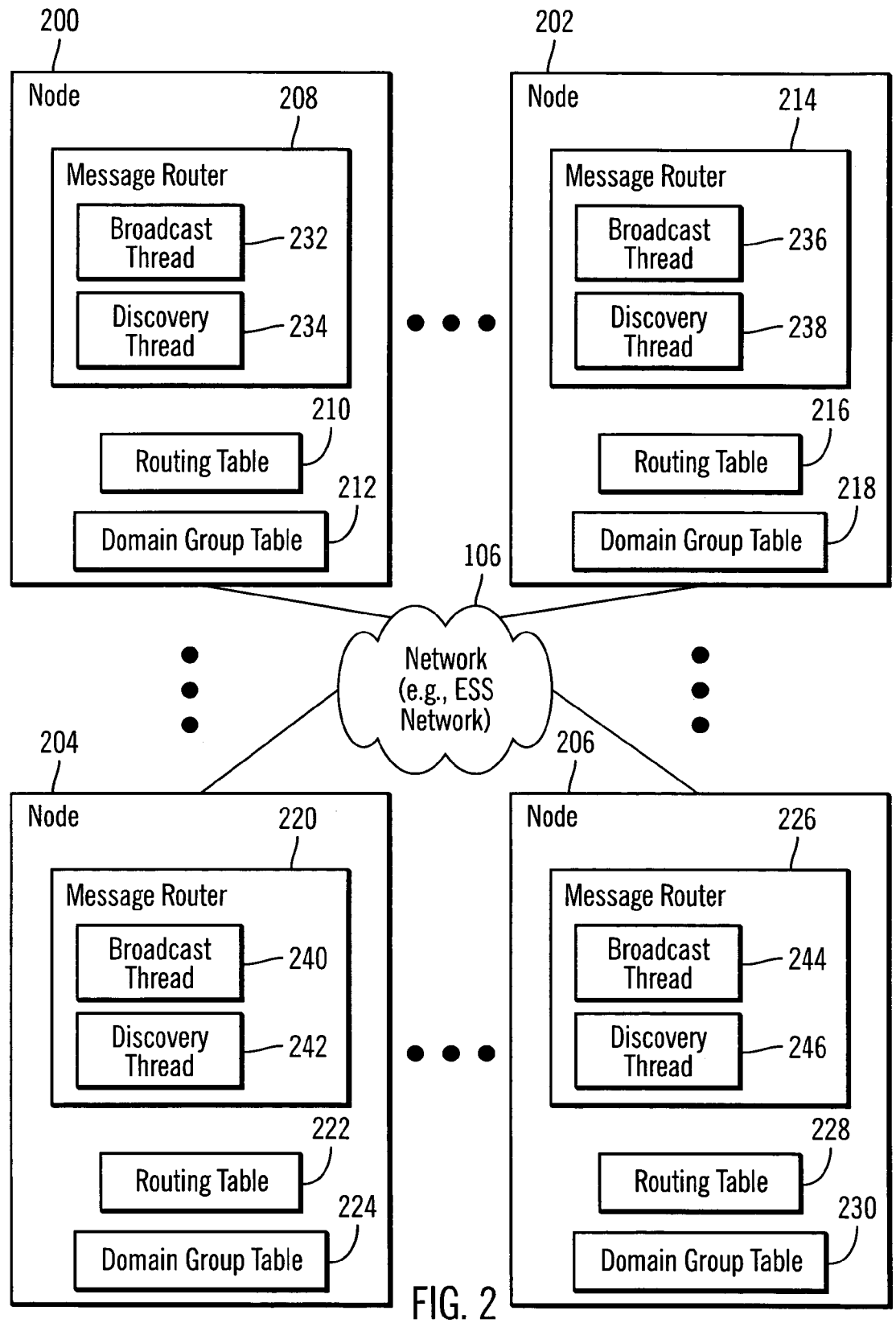
FIG. 2 illustrates a block diagram that shows components and data structures included in the nodes of the computing environment, in accordance with certain embodiments.

FIG. 2 illustrates a block diagram that shows components and data structures included in exemplary nodes of the computing environment 100, in accordance with certain embodiments.

In FIG. 2, a plurality of exemplary nodes 200, 202, 204, 206 are coupled over the network 106. The exemplary nodes 200, 202, 204, 206 may include the nodes 108, 110, 112, 114, 116 illustrated in FIG. 1. For example, in certain embodiments the node 200 may be the administrative console 108, and nodes 202, 204, 206 may be the nodes 110, 114, 116 respectively. In alternative embodiments, there may be fewer or a greater number of nodes that communicate over the network 106.

Each of the nodes 200, 202, 204, 206 may include a message router, a routing table, and a domain group table. For example, the exemplary node 200 may include a message router 208, a routing table 210, and a domain group table 212, the exemplary node 202 may include a message router 214, a routing table 216, and a domain group table 218, the exemplary node 204 may include a message router 220, a routing table 222, and a domain group table 224, and the exemplary node 206 may include a message router 226, a routing table 228, and a domain group table 230.

The message routers 208, 214, 220, 226 are capable of sending and receiving messages over the network 106. In certain embodiments each message router may comprise a broadcast thread and a discovery thread, where the broadcast thread broadcasts messages and the discovery thread listens to messages, wherein a message includes communications sent over the network 106. For example, in certain embodiments the message router 208 may include a broadcast thread 232 and a discovery thread 234, the message router 214 may include a broadcast thread 236 and a discovery thread 238, the message router 220 may include a broadcast thread 240 and a discovery thread 242, and the message router 226 may include a broadcast thread 244 and a discovery thread 246.

In certain embodiments, the routing tables 210, 216, 222, 228 may include entries corresponding to a set of nodes that have been previously discovered by the node on which the routing table is stored. For example, the routing table 210 on node 200 may store entries corresponding to nodes 204, 206 that may have been previously discovered by the discovery thread 234 that runs on the message router 208 of node 200.

The domain group tables 212, 218, 224, 230 may include entries corresponding to domain groups, where, for certain processes, nodes that belong to the same domain group may be substituted by each other. For example, in certain embodiments if node 200 corresponds to the primary image server 110 and node 202 corresponds to the alternate image server 112, then nodes 200 and 202 may belong to the same domain group.

Therefore, FIG. 2 illustrates certain embodiments in which a plurality of nodes 200, 202, 204, 206 communicate over a network 106, where each node has a message router that broadcasts messages and discovers new nodes. The message router may also send messages to alternate nodes, by using a routing table and a domain group table.

Figure 3:
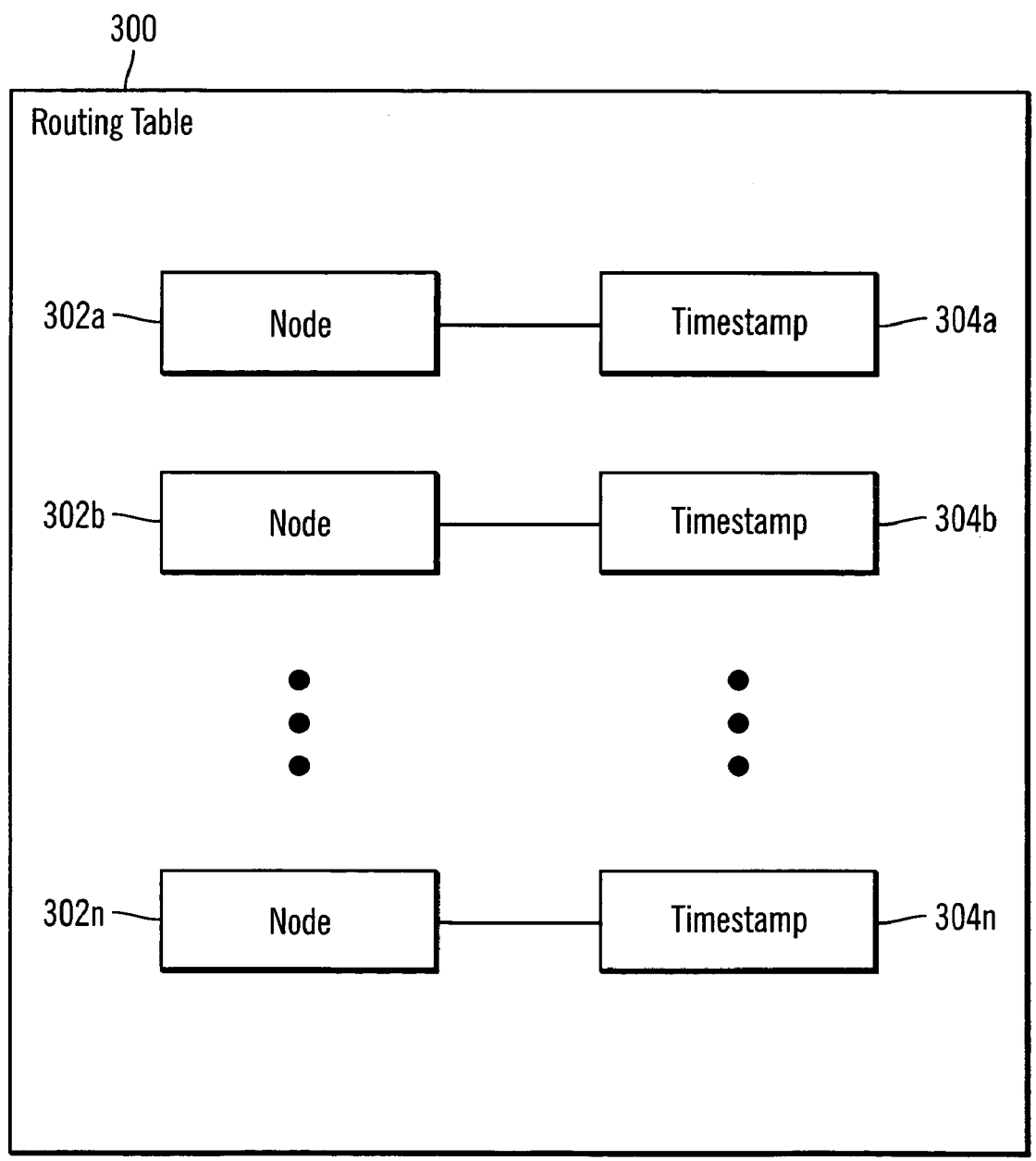
FIG. 3 illustrates a block diagram of a routing table, in accordance with certain embodiments.

FIG. 3 illustrates a block diagram of an exemplary routing table 300 that may be implemented in the nodes 108, 110, 112, 114, 116, 200, 202, 204, 206, in accordance with certain embodiments. In certain exemplary embodiments, the exemplary routing table 300 may be an embodiment of the routing tables 210, 216, 222, 228.

The routing table for a node may store entries corresponding to nodes that may have been previously discovered by the discovery threads 234, 238, 242, 246. For example, the routing table 300 may include entries for a plurality of nodes 302a, 302b, . . . 302n, where each entry is associated with a timestamp 304a, 304b, . . . 304n. The timestamp associated with a node indicates the time at which the node was last discovered.

For example, in certain embodiments the node 302a may be added to the routing table 300 at a certain instant of time, where the instant of time is stored in the timestamp 304a. Subsequently, when the presence of the added node 302a is discovered once again at a new instant of time, then the timestamp 304a is updated with the new instant of time.

Therefore, FIG. 3, illustrates certain embodiments in which a routing table 300 stores entries that include discovered nodes 302a . . . 302n and corresponding timestamps 304a . . . 304n. Entries for selected nodes and corresponding timestamps may be removed from the routing table 300, when messages have not been received from the selected nodes for a predetermined period of time.

Figure 4:
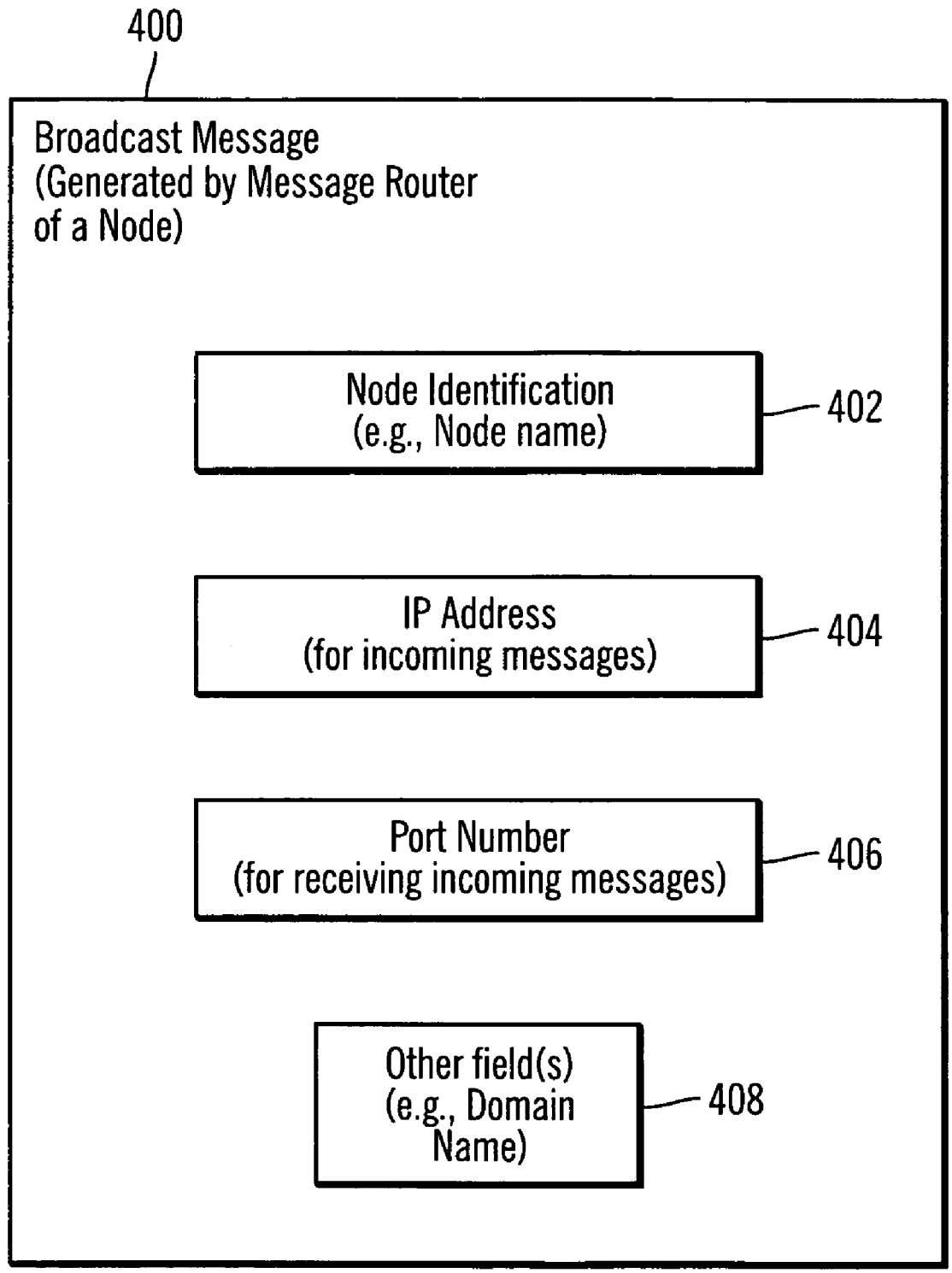
FIG. 4 illustrates a block diagram of a broadcast message, in accordance with certain embodiments.

FIG. 4 illustrates a block diagram of an exemplary broadcast message 400 generated by a message router, such as message router 208, 214, 220 or 226, in accordance with certain embodiments.

The exemplary broadcast message 400 includes a node identification 402, an Internet Protocol (IP) address 404, a port number 406, and other fields 408. For example, the node identification 402 may include the name of the ESS server 110 that is sending the broadcast message 400. The IP address 404 indicates the IP address where incoming application messages can be received by the sending node of the exemplary broadcast message 400. The port number 406 indicates a port number where incoming application messages can be received by the sending node of the exemplary broadcast message 400. Other fields 408 may include the domain name to which the sending node of the exemplary broadcast message belongs. For example, the domain name corresponding to the ESS servers 110, 112 may be the storage facility 102.

Therefore, FIG. 4 illustrates certain embodiments in which an exemplary broadcast message 400 is transmitted from one node to other nodes in the network 106. The plurality of nodes that are coupled to the network 106 may send a plurality of broadcast messages over the network 106.

Figure 5:
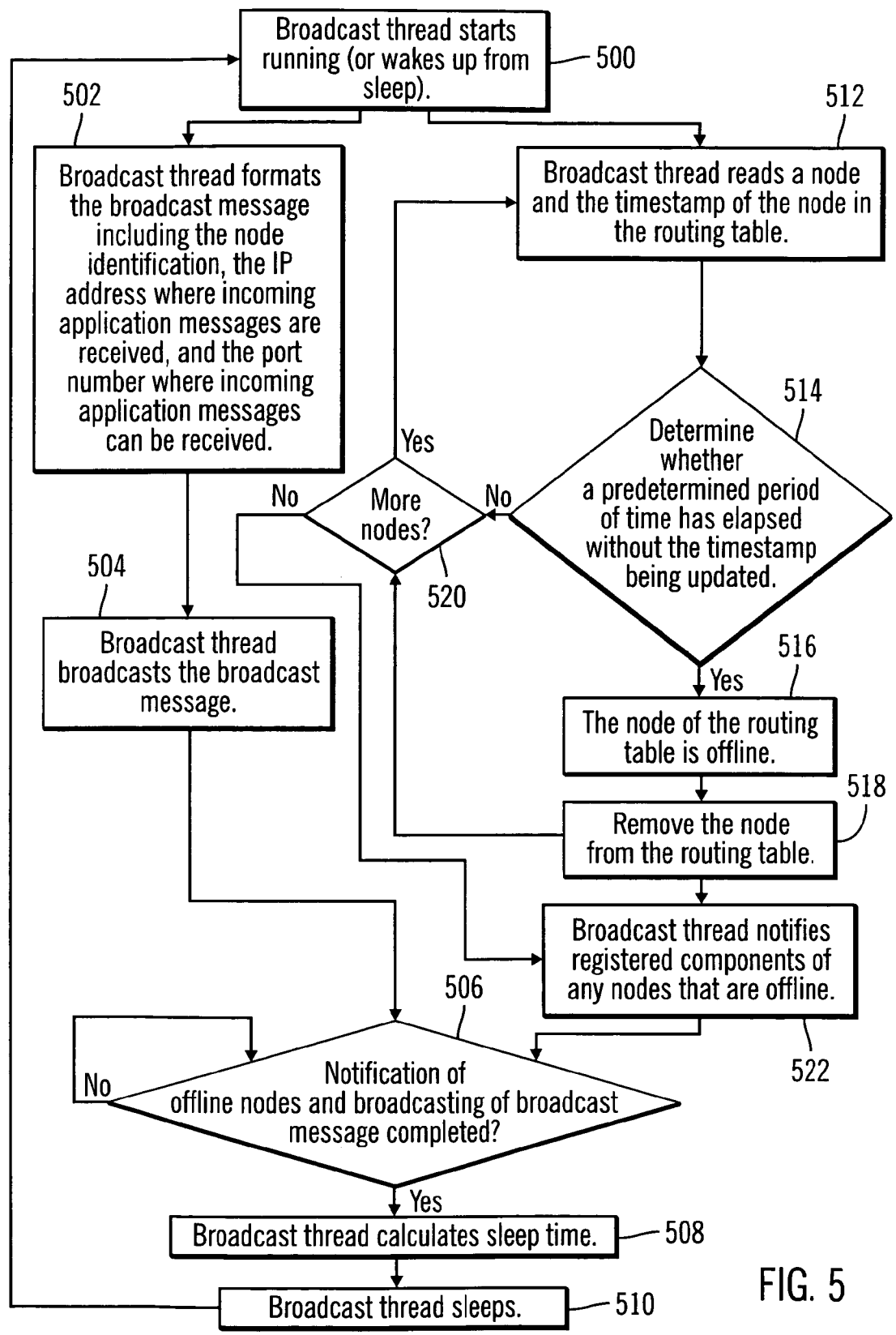
FIG. 5 illustrates operations for determining offline nodes and broadcasting messages, in accordance with certain embodiments.

FIG. 5 illustrates operations for determining offline nodes and operations for broadcasting messages, such as, broadcast message 400, implemented in a broadcast thread, such as broadcast thread 232, 236, 240 or 244, in accordance with certain embodiments.

Control starts at block 500, where the broadcast thread starts running. For example, in certain embodiments the broadcast thread may start running for the first time after being spawned by a message router, such as, message router 208, 214, 220 or 226. In other embodiments, the broadcast thread may wake up from sleep and start running once again. From block 500, control may proceed in parallel to block 502 where a transmission of a broadcast message is initiated, and to block 512 where the notification of offline nodes to registered components is initiated.

The broadcast thread formats (at block 502) the broadcast message 400 including the node identification 402, the IP address 404 where incoming application messages are received, and the port number 406 where incoming application messages can be received. In certain embodiments, the broadcast thread formats other fields 408, such as, fields indicating domain names, in the broadcast message 400.

The broadcast thread broadcasts (at block 504) the broadcast message, and control proceeds to block 506, where the broadcast thread determines whether the notification of offline nodes to registered components and the broadcasting of the broadcast message have completed. If so, the broadcast thread calculates (a block 508) a sleep time and sleeps (at block 510) for a time period indicated by the sleep time. Subsequently, the broadcast thread wakes up and starts running (at block 500) again.

In parallel to the execution of the operations described in blocks 502 and 504, the broadcast thread reads (at block 512) a selected node and the corresponding timestamp of the node in the exemplary routing table 300. For example, the broadcast thread 232 may read the routing table 210 and the broadcast thread 236 may read the routing table 216.

The broadcast thread determines (at block 514) whether a predetermined period of time has elapsed without the timestamp being updated for the selected node. For example, the broadcast thread may determine whether 20 seconds have elapsed without the timestamp 304a being updated for the selected node 302a. If a predetermined period of time has elapsed without the timestamp being updated for the selected node, then the selected node in the routing table has not been discovered for the predetermined period of time and the broadcast thread determines (at block 516) that the selected node is offline. The predetermined time may be any time interval, such as 10 microseconds, 30 milliseconds, 5 seconds, 2 minutes, etc.

The broadcast thread removes (at block 518) the selected node from the routing table 300, as the selected node has been determined to be offline. The broadcast thread determines (at block 520) if there are more nodes in the routing table 300 and if (at block 520) there are more nodes, then the operations of block 512, 514, 516, 518 may be repeated in certain embodiments. The broadcast node notifies (at block 520) the identities of all the removed nodes to the registered components, such as, system or application programs, where the removed nodes have been determined to be offline, wherein being offline implies that the offline node may not be available for other nodes that are coupled to the network 106.

If the broadcast thread determines (at block 514) that a predetermined period of time has not elapsed without the timestamp being updated for the selected node, then the broadcast node determines (at block 520) if there are more nodes in the routing table. If so, control proceeds to block 512, and if not, control proceeds to block 522.

After the broadcast thread has notified (at block 522) all registered components of any nodes that are offline, control proceeds to block 506, where the broadcast thread determines whether the notification of offline nodes and the broadcasting of broadcast message have completed.

Therefore, FIG. 5 illustrates certain embodiments in which a broadcast thread of a message router of a node, such as, broadcast thread 232, 236, 240 or 244, determines whether any node that has been previously discovered has gone offline and notifies the offline status to registered components. The broadcast thread also sends broadcast messages 400 to other nodes of the network 106.

Figure 6:
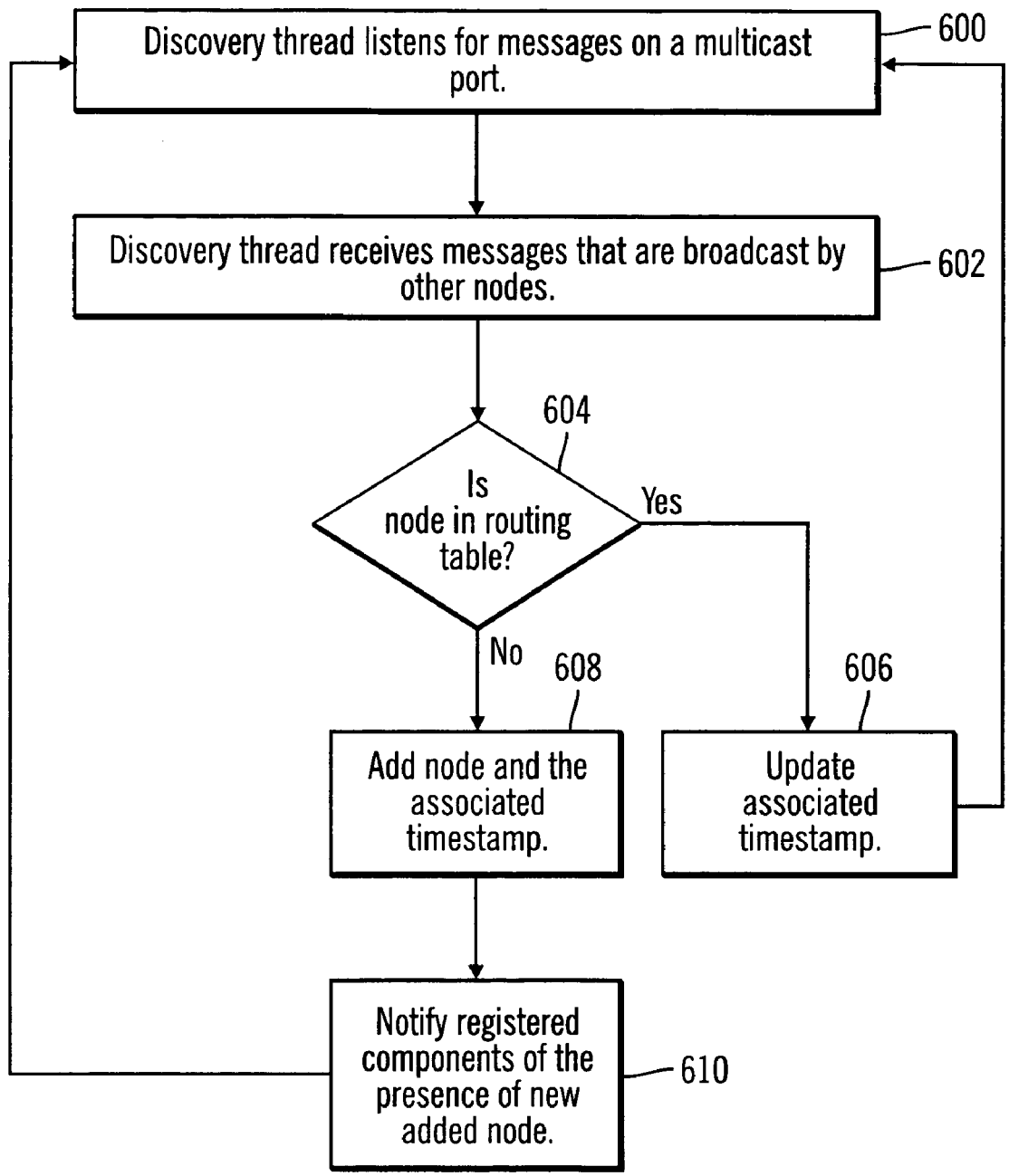
FIG. 6 illustrates operations for discovering and adding nodes, in accordance with certain embodiments.

FIG. 6 illustrates operations implemented in a discovery thread, such as, discovery thread 234, 238, 242 or 244, for discovering and adding nodes, in accordance with certain embodiments.

Control starts at block 600, where a discovery thread listens for messages on a multicast port of the node on which the discovery thread executes. The discovery thread receives messages that are broadcast by one or more nodes, where the messages are received on the multicast port.

The discovery thread determines (at block 604), for a received message, whether the node that sent the message is in the routing table. For example, the discovery thread 234 may determine that a message has been received from node 202 by examining the message, and may then determine whether node 202 is already included in the routing table 210 of the node 200 on which the discovery thread 234 executes.

If the discovery thread determines (at block 604) that the sender node corresponding to a received message is already included in an entry of the routing table 300, then the discovery thread updates (at block 606) the associated timestamp, such as timestamps 304a, 304b, . . . 304n, etc. Therefore, the discovery thread records the most recent time of receiving a message from a node.

If the discovery thread determines (at block 604) that the sender node corresponding to a received message is not included in an entry of the routing table 300, then the discovery thread adds (at block 608) the sender node and the associated timestamp to the routing table 300. The discovery thread notifies registered components, such as, system and application programs, of the presence of the new added sender node.

Therefore, FIG. 6 illustrates certain embodiments in which the discovery thread adds newly discovered nodes and updates timestamps in the routing table 300. The discovery thread also notifies registered components of the presence of newly discovered nodes.

Figure 7:
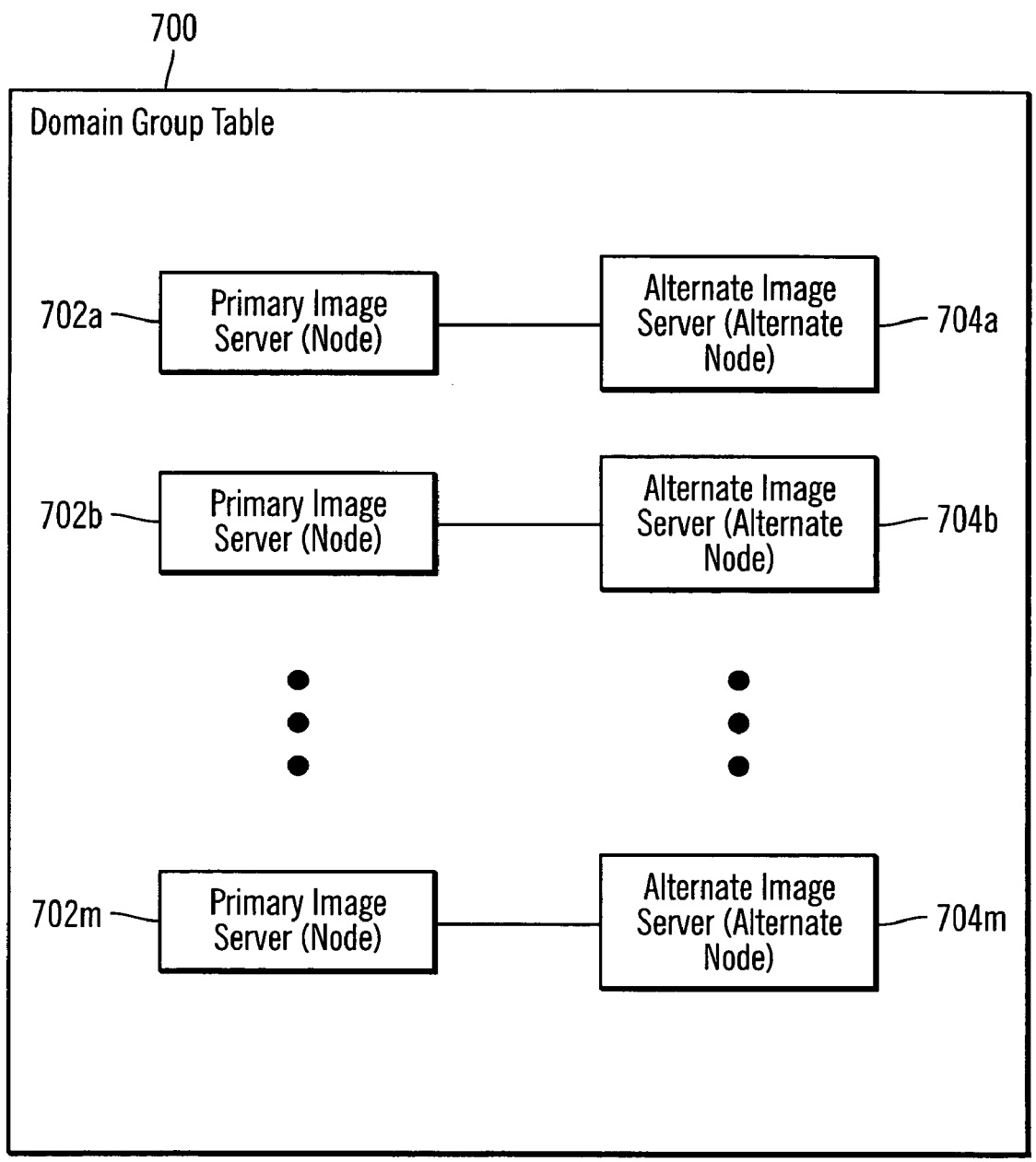
FIG. 7 illustrates a block diagram of a domain group table, in accordance with certain embodiments.

FIG. 7 illustrates a block diagram of an exemplary domain group table 700 implemented in some or all of the nodes coupled to the network 106, in accordance with certain embodiments.

The exemplary domain group table 700 may be an example of the domain group tables 212, 218, 224, 230. The domain group table 700 includes a plurality of entries, where each entry may include a plurality of nodes belonging to a domain group. For example, nodes 702a and 704a may be grouped into one entry, nodes 702b and 704b may be grouped into another entry, and nodes 702m and 704m may be grouped into yet another entry. Although, FIG. 7 illustrates two nodes per domain group, in alternative embodiments there may be a greater number of nodes per domain group, and different domain groups may include a different number of nodes.

For example, in certain embodiment, the node 702a may be the primary image server 110 of the storage facility 102, and the alternate node 704a of the domain group may be the alternate image server 112 of the storage facility 102.

If a node is not available then messages may be redirected or retransmitted to an alternate node of the same domain group. For example, if the node 702b is unavailable, i.e., offline, then messages may be redirected or retransmitted to the alternate node 704a.

Figure 8:
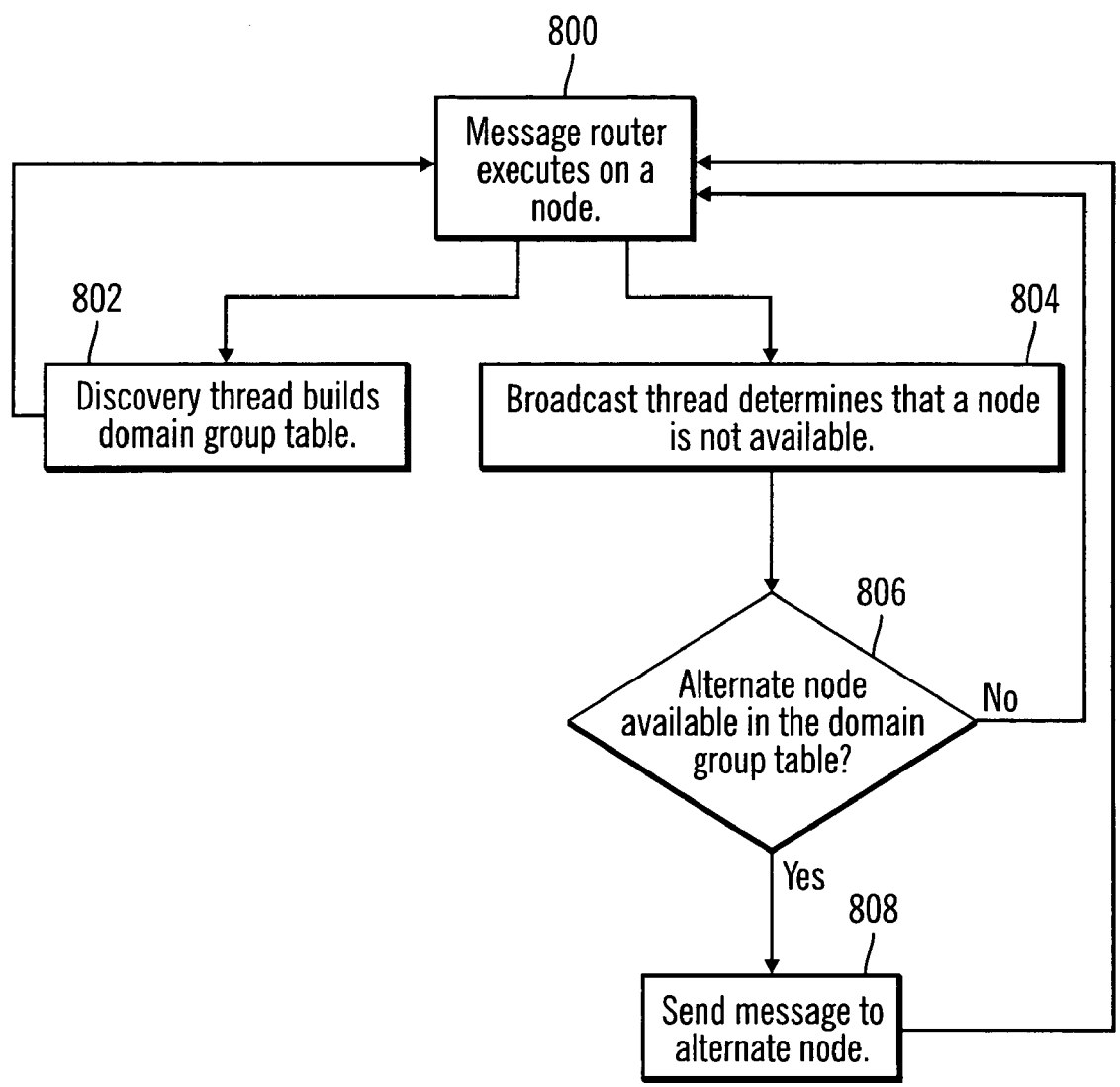
FIG. 8 illustrates operations for sending messages to an alternate node, in accordance with certain embodiments.

FIG. 8 illustrates operations implemented in an exemplary message router, such as the message router 208, 214, 220, or 226 for sending messages to an alternate node, in accordance with certain embodiments.

Control starts at block 800, where the exemplary message router executes on a node. For example, the message router 208 may execute on node 200. Control proceeds in parallel to block 802 where an exemplary discovery thread builds the domain group table 700, and to block 804 where an exemplary broadcast thread determines that a node is not available, i.e. offline. A node is offline when it is not available to other nodes via the network 106.

After the discovery thread builds (at block 802) the domain group table 700, control returns to block 800. After the broadcast thread determines (at block 804) that a node is not available control proceeds to block 806, where the exemplary message router determines whether an alternate node corresponding to the unavailable node is available in the domain group table 700. If so, then the message router sends (at block 808) a message to the alternate node. If not, then control returns to block 800. After sending (at block 808) the message to the alternate node the message router continues (at block 800) to execute.

Therefore, FIG. 8 illustrates certain embodiments in which a message router sends a message to an alternate node belonging to the same domain group as an unavailable node.

Certain embodiments allow the detection of ESS server nodes that come online or are taken offline, without requiring manual intervention. The message routers 208, 214, 220, 226 may detect a change in the computing environment 100, recognize the type of change, and may be able to respond or recover from the change. Through ESS node discovery, components may learn about new storage facilities that are added to the computing environment without having to reconfigure ESS management software or the individual storage facilities. As a result, the ESS network 106 may link additional nodes, or take corrective action in the event of a failure of certain nodes.

Certain embodiments allow the discovery of ESS nodes that are operational. Some embodiments are able to discover when these operational nodes are taken offline. Furthermore, certain embodiments are further able to discover when these offline nodes become online once again. Certain embodiments also notify registered applications when there is a change in the status of an ESS node.

In certain embodiments, when parallel applications run on different nodes a command may be addressed to an application on a particular destination node. If the particular destination node is unavailable, certain embodiments may allow the command to be addressed to an alternate node for processing. The alternate node may in certain embodiments be a redundant node. The rerouting of commands may be performed by a message router that determines an available node in the same domain group as an unavailable node. The embodiments provide a mechanism to reroute messages based on the needs of a message router in a node.

ADDITIONAL EMBODIMENT DETAILS

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 9:
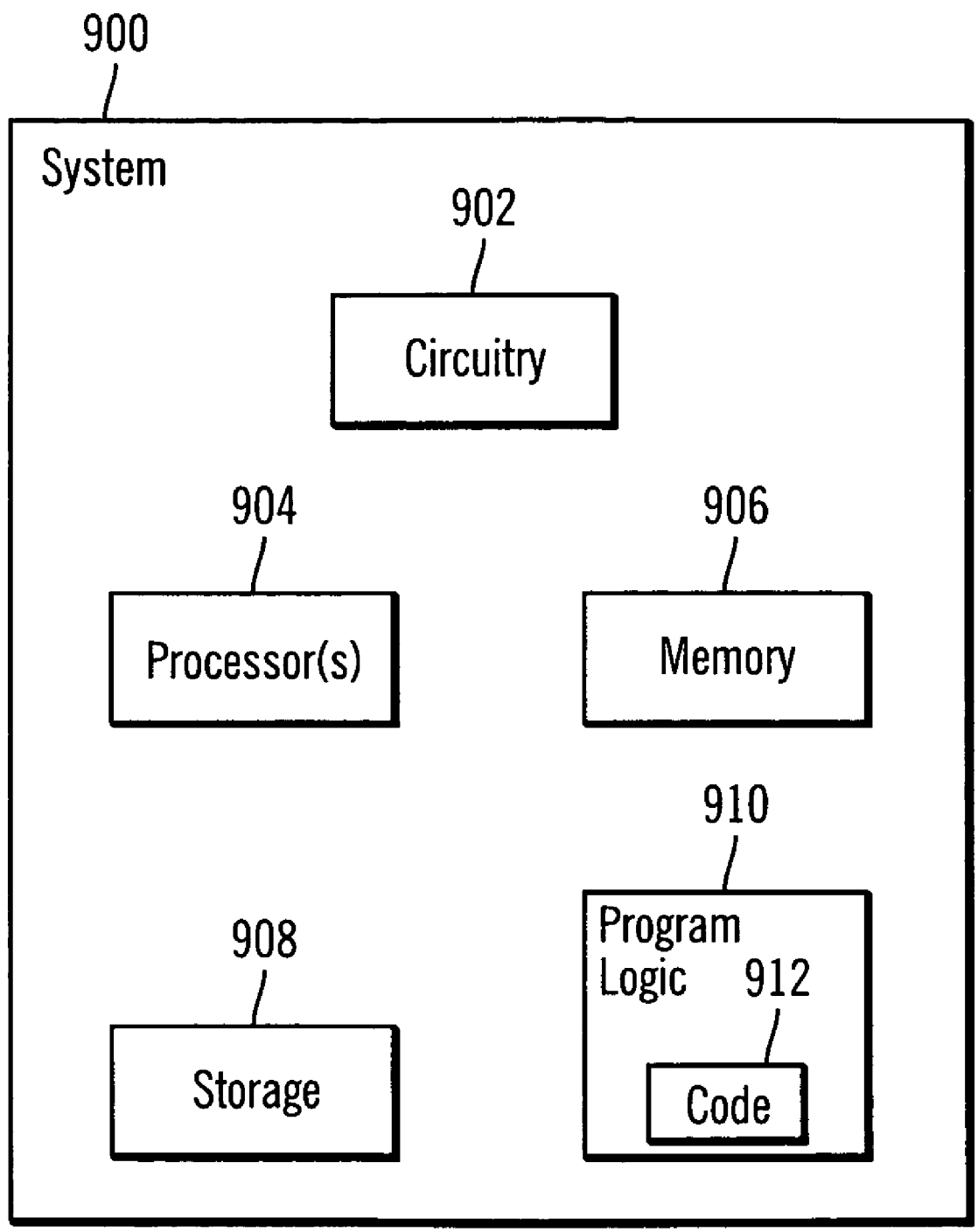
FIG. 9 illustrates a system in which certain embodiments are implemented.

FIG. 9 illustrates a block diagram of a system 900 in which certain embodiments may be implemented. In certain embodiments, the nodes 108, 110, 112, 114, 116, 200, 202, 204, 206 may be implemented in accordance with the system 900. The system 900 may include a circuitry 902 that may in certain embodiments include a processor 904. The system 900 may also include a memory 906 (e.g., a volatile memory device), and storage 908. Certain elements of the system 900 may or may not be found in some or all of the nodes 108, 110, 112, 114, 116, 200, 202, 204, 206. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 5, 6, 8 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-9 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

*IBM, TotalStorage, and Enterprise Storage Server are trademarks or registered trademarks of IBM Corporation.

What is claimed is:

1. A method, comprising:

sending, from at least one node of a plurality of nodes of a network, a plurality of broadcast messages;

discovering, by at least one other node of the plurality of nodes of the network, a node based on a received message;

storing, by the at least one other node of the plurality of nodes of the network, an entry corresponding to the node and a corresponding timestamp that indicates a time at which the node was last discovered; and notifying, by the at least one node of the plurality of nodes of the network, that the node is offline, in response to determining that a predetermined time has elapsed since the corresponding timestamp was last updated, wherein the node is a selected node of the plurality of nodes, and wherein the method further comprises:

(i) reading, by the at least one node of the plurality of nodes of the network, the selected node and a selected timestamp corresponding to the selected node from a routing table;

(ii) determining, by the at least one node of the plurality of nodes of the network, whether the predetermined time has elapsed since the corresponding timestamp was last updated for the selected node in the routing table; and (iii) determining, by the at least one node of the plurality of nodes of the network, registered components that have registered to be informed on offline nodes, wherein the offline nodes are notified to the registered components; and (iv) removing, by the at least one node of the plurality of nodes of the network, the selected node from the routing table, in response to determining that the predetermined time has elapsed since the corresponding timestamp was last updated for the selected node in the routing table, wherein the plurality of nodes are included in a plurality of storage facilities, wherein the plurality of storage facilities includes primary and alternate image servers that comprise the plurality of nodes, wherein a domain group table includes correspondences between the primary and the alternate image servers, wherein the correspondences are indicative of a plurality of domain groups of the plurality of nodes, wherein an operational node of a selected domain group processes redirected messages that were generated for an offline node of the selected domain group, wherein the offline node is in a selected primary image server included in a selected storage facility and the operational node is a selected alternate image server included in the selected storage facility, and wherein the selected primary image server and the selected alternate image server belong to the selected domain group, and wherein the selected alternate image server stores backup data of the selected primary image server.

2. The method of claim 1, wherein the sending of the broadcast messages further comprises:

generating a broadcast message to include node identification of a sender node of the broadcast message, an Internet Protocol address where incoming messages are received in the sender node, and a port number where the incoming messages are received in the sender node; and broadcasting the broadcast message to the network.

3. The method of claim 1, and wherein the discovering and the storing further comprise:

listening on a multicast port for a broadcast message;

determining whether a sender node of the broadcast message is indicated in, wherein the discovered node is the sender node;

updating the corresponding timestamp of the sender node, in response to determining that the sender node is indicated in the routing table; and adding the sender node and the corresponding timestamp to the routing table, in response to determining that the sender node is not indicated in.

4. The method of claim 1, further comprising:

maintaining the routing table that indicates a set of nodes selected from the plurality of nodes with last recorded times at which the set of nodes were operational.

5. The method of claim 4, further comprising:

executing a message router on one node;

building the domain group table via a discovery thread; and determining unavailability of nodes via a broadcast thread.

6. A method for deploying computing infrastructure, comprising integrating computer-readable code into a computing system, wherein the code in combination with the computing system is capable of performing:

sending, from at least one node of a plurality of nodes of a network, a plurality of broadcast messages;

discovering, by at least one other node of the plurality of nodes of the network, a node based on a received message;

storing, by the at least one other node of the plurality of nodes of the network, an entry corresponding to the node and a corresponding timestamp that indicates a time at which the node was last discovered; and notifying, by the at least one node of the plurality of nodes of the network, that the node is offline, in response to determining that a predetermined time has elapsed since the corresponding timestamp was last updated, wherein the node is a selected node of the plurality of nodes, and wherein the code in combination with the computing system is further capable of performing:

(i) reading, by the at least one node of the plurality of nodes of the network, the selected node and a selected timestamp corresponding to the selected node from a routing table;
(ii) determining, by the at least one node of the plurality of nodes of the network, whether the predetermined time has elapsed since the corresponding timestamp was last updated for the selected node in the routing table; and
(iii) determining, by the at least one node of the plurality of nodes of the network, registered components that have registered to be informed on offline nodes, wherein the offline nodes are notified to the registered components; and
(iv) removing, by the at least one node of the plurality of nodes of the network, the selected node from the routing table, in response to determining that the predetermined time has elapsed since the corresponding timestamp was last updated for the selected node in the routing table, wherein the plurality of nodes are included in a plurality of storage facilities, wherein the plurality of storage facilities includes primary and alternate image servers that comprise the plurality of nodes, wherein a domain group table includes correspondences between the primary and the alternate image servers, wherein the correspondences are indicative of a plurality of domain groups of the plurality of nodes, wherein an operational node of a selected domain group processes redirected messages that were generated for an offline node of the selected domain group, wherein the offline node is in a selected primary image server included in a selected storage facility and the operational node is a selected alternate image server included in the selected storage facility, and wherein the selected primary image server and the selected alternate image server belong to the selected domain group, and wherein the selected alternate image server stores backup data of the selected primary image server.

7. The method of claim 6, the sending of the broadcast messages further comprises:
generating a broadcast message to include node identification of a sender node of the broadcast message, an Internet Protocol address where incoming messages are received in the sender node, and a port number where the incoming messages are received in the sender node; and
broadcasting the broadcast message to the network.

8. The method of claim 6, wherein the discovering and the storing further comprise:
listening on a multicast port for a broadcast message;
determining whether a sender node of the broadcast message is indicated in, wherein the discovered node is the sender node;
updating the corresponding timestamp of the sender node, in response to determining that the sender node is indicated in the routing table; and
adding the sender node and the corresponding timestamp to the routing table, in response to determining that the sender node is not indicated in.

9. The method of claim 6, further comprising: maintaining the routing table that indicates a set of nodes selected from the plurality of nodes with last recorded times at which the set of nodes were operational.

10. The method of claim 9, further comprising:
executing a message router on one node;
building the domain group table via a discovery thread; and
determining unavailability of nodes via a broadcast thread.

* * * * *